United States Patent
Shin

(10) Patent No.: US 11,288,014 B2
(45) Date of Patent: Mar. 29, 2022

(54) CONTROLLER, OPERATING METHOD OF CONTROLLER AND STORAGE DEVICE INCLUDING THE SAME

(71) Applicant: SK hynix Inc., Icheon (KR)

(72) Inventor: Ju Yong Shin, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 16/922,790

(22) Filed: Jul. 7, 2020

(65) Prior Publication Data
US 2021/0240391 A1    Aug. 5, 2021

(30) Foreign Application Priority Data

Feb. 3, 2020   (KR) .................. 10-2020-0012602

(51) Int. Cl.
*G06F 3/06*     (2006.01)
*G06F 9/48*     (2006.01)

(52) U.S. Cl.
CPC .......... *G06F 3/0659* (2013.01); *G06F 3/0611* (2013.01); *G06F 3/0653* (2013.01); *G06F 3/0679* (2013.01); *G06F 9/4881* (2013.01)

(58) Field of Classification Search
CPC .... G06F 3/0659; G06F 3/0611; G06F 3/0653; G06F 3/0679; G06F 3/06; G06F 3/0614; G06F 3/0688; G06F 3/061; G06F 3/0658; G06F 9/4881; G06F 13/1642; G06F 12/00; G06F 13/18
See application file for complete search history.

(56) References Cited

U.S. PATENT DOCUMENTS

| | | | |
|---|---|---|---|
| 6,687,765 B2 * | 2/2004 | Surugucchi | G06F 3/0605 710/15 |
| 7,404,033 B2 | 7/2008 | Li et al. | |
| 2012/0260026 A1 * | 10/2012 | Cornwell | G06F 3/0659 711/103 |
| 2013/0254454 A1 * | 9/2013 | Ide | G06F 3/0688 711/5 |
| 2017/0269669 A1 * | 9/2017 | Choi | G11C 16/30 |
| 2019/0079676 A1 * | 3/2019 | Seo | G06F 13/4234 |

FOREIGN PATENT DOCUMENTS

KR    1019970008188    5/1997
KR    1020180050862    5/2018

* cited by examiner

*Primary Examiner* — Kalpit Parikh

(57) ABSTRACT

A controller may be configured to control an operation of a nonvolatile memory and to determine a write command processing schedule by analyzing patterns of commands queued in a command queue during a first unit time, the commands queued in the command queue during the first unit time including a first write command, a first read command, or both and to process a second write command queued in the command queue during a second unit time subsequent to the first unit time, based on the determined write command processing schedule.

25 Claims, 12 Drawing Sheets

CONTROLLER, OPERATING METHOD OF CONTROLLER AND STORAGE DEVICE INCLUDING THE SAME

CROSS-REFERENCES TO RELATED APPLICATION

The present application claims priority under 35 U.S.C. § 119(a) to Korean application number 10-2020-0012602, filed on Feb. 3, 2020, in the Korean Intellectual Property Office, which is incorporated herein by reference in its entirety.

BACKGROUND

1. Technical Field

Various embodiments generally relate to an electronic device, and more particularly, to a controller, an operating method of the controller and a storage device including the same.

2. Related Art

Recently, the paradigm of a computer environment changes to ubiquitous computing in which computer systems can be used anywhere, at any time. Accordingly, the use of portable electronic devices, such as a mobile phone, a digital camera and a notebook computer, is increasing rapidly. In general, such a portable electronic device employs a data storage device using a memory device. The data storage device is used to store data used in a portable electronic device.

The data storage device using a memory device has advantages in that it has excellent stability and durability because it does not include a mechanical driving unit and has a very fast access speed of information and small power consumption. Examples of the data storage device having such advantages includes a universal serial bus (USB) memory device, a memory card having various interfaces, a universal flash storage (UFS) device and a solid state drive (SSD).

SUMMARY

An embodiment provides a controller capable of improving read performance, an operating method of the controller and a storage device including the same.

Furthermore, an embodiment provides a controller capable of improving the reliability of data, an operating method of the controller and a storage device including the same.

In an embodiment, a controller may be configured to control an operation of a nonvolatile memory and to determine a write command processing schedule by analyzing patterns of commands queued in a command queue during a first unit time, the commands queued in the command queue during the first unit time including a first write command, a first read command, or both and to process a second write command, queued in the command queue during a second unit time subsequent to the first unit time, based on the determined write command processing schedule.

In an embodiment, an operating method of a controller may include analyzing patterns of commands queued in a command queue during a first unit time, the commands queued in the command queue during the first unit time including a first write command, a first read command, or both, determining a write command processing schedule based on the patterns of the commands, and processing a second write command, queued in the command queue during a second unit time subsequent to the first unit time, based on the determined write command processing schedule.

In an embodiment, a storage device may include a nonvolatile memory and a controller configured to control an operation of the nonvolatile memory in response to a request from a host. The controller may be configured to determine a write command processing schedule by analyzing patterns of commands queued in a command queue during a first unit time, the commands queued in the command queue during the first unit time including a first write command, a first read command, or both and to process a second write command, queued in the command queue during a second unit time subsequent to the first unit time, based on the determined write command processing schedule.

DETAILED DESCRIPTION

Various embodiments will be described below with reference to the accompanying drawings.

Figure 1:
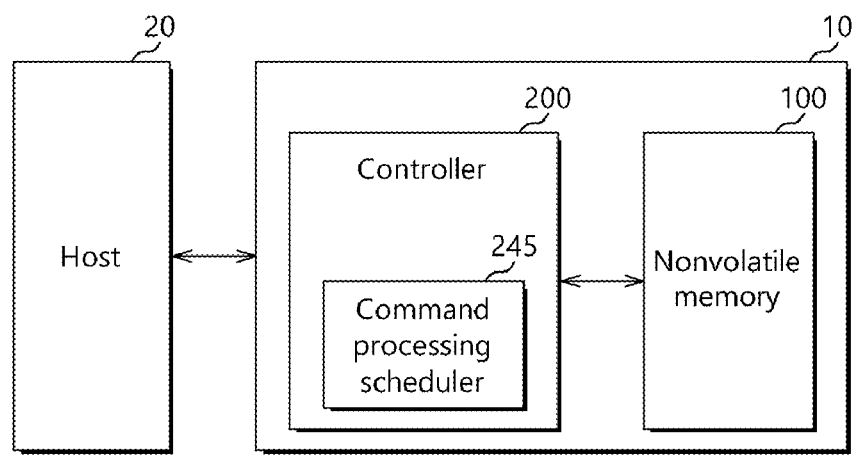
FIG. 1 illustrates a storage device according to an embodiment.

FIG. 1 is a diagram illustrating the configuration of a storage device 10 according to an embodiment.

Referring to FIG. 1, the storage device 10 according to the present embodiment may store data accessed by a host 20, such as a mobile phone, an MP3 player, a laptop computer, a desktop computer, a game machine, TV or an in-vehicle infotainment system. The storage device 10 may be called a memory system.

The storage device 10 may be configured as any one of various types of storage devices depending on an interface protocol coupled to the host 20. For example, the storage device 10 may be configured as any one of a solid state drive (SSD), a MultiMediaCard (MMC), embedded MMC (eMMC), Reduced-Size MMC (RS-MMC) or micro-MMC type, a secure digital (SD) card having an SD, mini-SD or micro-SD type, a storage device having a universal serial bus (USB) storage device, universal flash storage (UFS) device, or personal computer memory card international association (PCMCIA) card type, a storage device having a peripheral component interconnection (PCI) card type, a storage device having a PCI-express (PCI-e) card type, a compact flash (CF) card, a smart media card, and a memory stick.

The storage device 10 may be fabricated as any one of various package types. For example, the storage device 10 may be fabricated as any one of a package on package (POP), a system in package (SIP), a system on chip (SOC), a multi-chip package (MCP), a chip on board (COB), a wafer-level fabricated package (WFP), and a wafer-leveling stack package (WSP).

The storage device 10 may include a nonvolatile memory 100 and a controller 200.

The nonvolatile memory 100 may operate as a data storage medium of the storage device 10. The nonvolatile memory 100 may be configured as any one of various types of nonvolatile memories, such as a NAND flash memory device, a NOR flash memory device, a ferroelectric random access memory (FRAM) using a ferroelectric capacitor, a magnetic random access memory (MRAM) using a tunneling magneto-resistive (TMR) film, a phase change random access memory (PRAM) using chalcogenide alloys, and a resistive random access memory (ReRAM) using transition metal oxide, depending on a memory cell.

Figure 14:
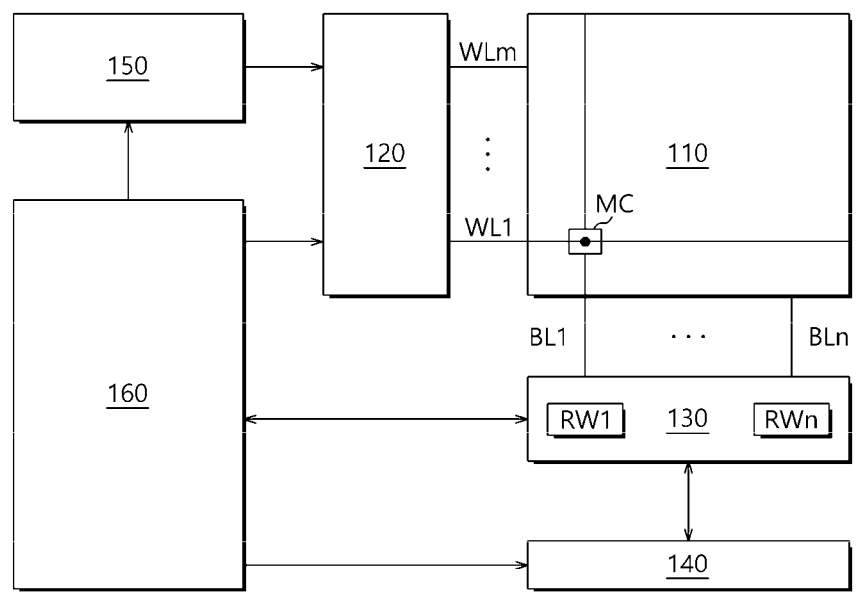
FIG. 14 illustrates a nonvolatile memory device included in a data storage apparatus in accordance with an embodiment.

The nonvolatile memory 100 may include a memory cell array having a plurality of memory cells disposed in respective areas in which a plurality of bit lines and a plurality of word lines intersect, such as shown in FIG. 14. The memory cell array may include a plurality of memory blocks. Each of the plurality of memory blocks may include a plurality of pages.

For example, each of the memory cells of the memory cell array may be a single level cell (SLC) capable of storing data of one bit, a multi-level cell (MLC) capable of storing data of 2 bits, a triple level cell (TLC) capable of storing data of 3 bits or a quad level cell (QLC) capable of storing data of 4 bits. The memory cell array may include at least one of an SLC, an MLC, a TLC and a QLC. For example, the memory cell array may include memory cells having a two-dimensional horizontal structure or memory cells having a three-dimensional vertical structure.

Figure 3:
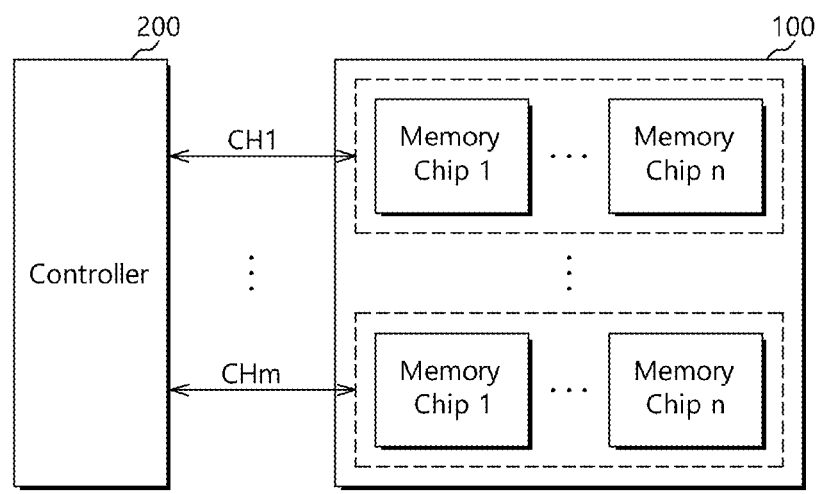
FIG. 3 illustrates the controller and a nonvolatile memory of FIG. 1 according to an embodiment.

Referring to FIG. 3, the nonvolatile memory 100 may include a plurality of memory chips. The plurality of memory chips may transmit and receive signals (or data) to and from the controller 200 through corresponding channels CH1 to CHm. One or more memory chips 1 to n may be coupled to each of the plurality of channels CH1 to CHm.

The controller 200 may control an overall operation of the storage device 10. The controller 200 may control the nonvolatile memory 100 to perform an operation corresponding to a request received from the host 20 in response to the request. For example, the controller 200 may generate control signals for controlling an operation of the nonvolatile memory 100 based on a request received from the host 20, and may provide the generated control signals to the nonvolatile memory 100. The control signals may include a command, an address, and an operation control signal, but embodiments are not limited thereto.

Figure 2:
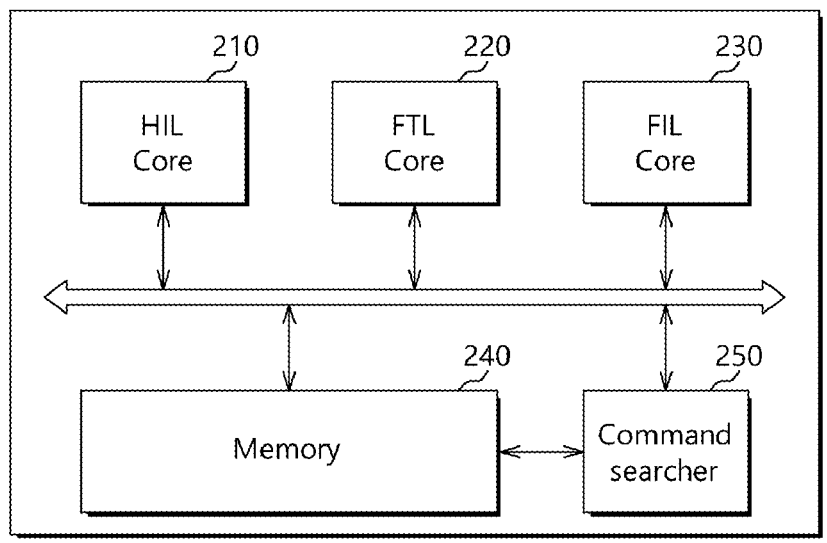
FIG. 2 illustrates a controller of FIG. 1 according to an embodiment.

FIG. 2 is a diagram illustrating the controller 200 of FIG. 1.

The controller 200 may include a first core (or host interface layer (HIL) core) 210, a second core (or flash translation layer (FTL) core) 220, a third core (or flash interface layer (FIL) core) 230, a memory 240 and a command searcher 250. While FIG. 2 shows the controller having separate first, second, and third cores 210, 220, and 230 and a separate command searcher 250 embodiments are not limited thereto. For example, in an embodiment, the second core 220 may perform some or all of the functions attributed to the first core 210, the third core 230, and/or the command searcher 250.

The first core 210 may be configured to interface between the host 20 and the storage device 10 in accordance with a protocol of the host 20. Accordingly, the first core 210 may be called a protocol core or a host interface layer (HIL) core. For example, the first core 210 may communicate with the host 20 through any one of universal serial bus (USB), universal flash storage (UFS), multimedia card (MMC), parallel advanced technology attachment (PATA), serial advanced technology attachment (SATA), small computer system interface (SCSI), serial attached SCSI (SAS), peripheral component interconnection (PCI), and PCI express (PCI-e) protocols.

The first core 210 may include a micro control unit (MCU) and/or a central processing unit (CPU). The first core 210 may interpret a request received from the host 20, and may provide the second core 220 with request information for generating a command corresponding to the received request. For example, the request information may include an operation type, address information, and data size information, but embodiments are not limited thereto.

Furthermore, the first core 210 may store, in a write buffer (not illustrated) of the memory 240, data (e.g., write data) received from the host 20. To this end, the controller 200 may further include a separate data transmission block (not illustrated) for transmitting data received from the host 20 to the write buffer of the memory 240. For example, in response to a control signal received from the first core 210, the data transmission block may receive data from the host 20 and store the received data in the write buffer of the memory 240.

Furthermore, the first core 210 may transmit to the host 20 data (e.g., read data) stored in a read buffer (not illustrated) of the memory 240. For example, in response to a control signal received from the first core 210, the data transmission block may read data stored in the read buffer of the memory 240 and transmit the read data to the host 20.

The second core 220 may control an overall operation of the storage device 10 through the execution of firmware or software loaded onto the memory 240. The second core 220 may interpret and execute an instruction or an algorithm expressed as computer codes, such as firmware or software. The second core 220 may be called a flash translation layer (FTL) core.

The second core 220 may include an MCU and/or a CPU.

The second core 220 may generate a command corresponding to a request received from the host 20, based on request information provided by the first core 210. Furthermore, the second core 220 may queue the generated command in a command queuing region 243 (shown in FIG. 4) of the memory 240. Furthermore, the second core 220 may generate a command corresponding to an operation performed within the storage device 10, that is, a background operation, without the intervention of the host 20, and may queue the generated command in the command queuing region 243 of the memory 240. The background operation may include a garbage collection and the like, but embodiments are not limited thereto.

The third core 230 dequeues, from the command queuing region 243, a command queued in the command queuing region 243 of the memory 240, and may provide the dequeued command to the nonvolatile memory 100. The third core 230 may be called a flash interface layer (FIL) core.

The third core 230 may include an MCU and/or a CPU.

The third core 230 may provide the nonvolatile memory 100 with write data stored in the write buffer of the memory 240, or may store, in the read buffer of the memory 240, read data received from the nonvolatile memory 100. To this end, the controller 200 may further include a separate data transmission block (not illustrated) for transmitting write data stored in the write buffer of the memory 240 to the nonvolatile memory 100 or transmitting read data received from the nonvolatile memory 100 to the read buffer of the memory 240, in response to a control signal received from the third core 230.

The memory 240 may be configured with a random access memory, such as a static random access memory (SRAM) or a dynamic random access memory (DRAM), but embodiments are not specially limited thereto. FIG. 2 the memory 240 has been illustrated as being included in the controller 200, but the memory 240 may be positioned outside the controller 200

The memory 240 may be physically and electrically coupled to the first core 210, the second core 220, the third core 230, and/or the command searcher 250. The memory 240 may store firmware executed by the second core 220. Furthermore, the memory 240 may store data necessary to execute the firmware, for example, meta data. That is, the memory 240 may operate as a working memory of the second core 220.

Furthermore, the memory 240 may temporarily store write data to be transmitted from the host 20 to the nonvolatile memory 100 and read data to be transmitted from the nonvolatile memory 100 to the host 20. That is, the memory 240 may operate as a buffer memory. An internal configuration of the memory 240 is described later with reference to FIG. 4.

The command searcher 250 may monitor whether a new command has been queued in the command queuing region 243 of the memory 240, and may provide the third core 230 with a signal indicating that the new command has been queued, when the new command is queued in the command queuing region 243. The command searcher 250 may periodically monitor the command queuing region 243 using a polling technique, but a technique for the command searcher 250 to monitor the command queuing region 243 is not limited to the polling technique.

When a signal is provided by the command searcher 250, the third core 230 may fetch a new command from the command queuing region 243 of the memory 240, and may provide the fetched new command to the nonvolatile memory 100.

Figure 4:
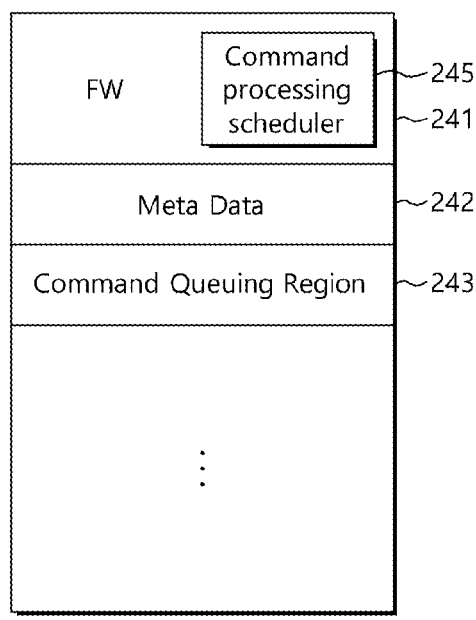
FIG. 4 illustrates a memory of FIG. 2 according to an embodiment.

FIG. 4 is a diagram illustrating the memory 240 of FIG. 2.

Referring to FIG. 4, the memory 240 according to the present embodiment may include a first region 241, a second region 242 and a third region 243, but embodiments are not limited thereto. For example, firmware (FW) (or software) interpreted and executed by the second core 220 may be stored in the first region 241 of the memory 240. Furthermore, meta data necessary to execute the FW (or software) may be stored in the second region 242 of the memory 240. Furthermore, commands generated by the second core 220 may be stored in the third region 243 of the memory 240.

For example, firmware stored in the first region 241 of the memory 240 may include a flash translation layer (FTL). In the present embodiment, the firmware and the FTL may be used as terms indicative of the same element. The FTL may be executed by the second core 220. The second core 220 may control a unique operation of the nonvolatile memory 100 by executing the FTL, and may provide device compatibility to the host 20. Through the execution of the FTL, the host 20 may use the storage device 10 by recognizing the storage device 10 as a common storage device such as a hard disk.

The FTL may be stored in a system region (not illustrated) of the nonvolatile memory 100. When the storage device 10 is powered on, the FTL may be read from the system region of the nonvolatile memory 100 and loaded onto the first region 241 of the memory 240. In an embodiment, the FTL may be loaded onto a dedicated memory (not illustrated) of the second core 220 instead of being loaded into the first region 241 of the memory 240.

Referring to FIG. 4, in the present embodiment, the FW may include a command processing scheduler 245. However, modules included in the FW are not limited to the command processing scheduler, and may include various modules, such as a write module, a read module, a garbage collection module, a wear-leveling module, a bad block management module, a power management module, and a map module. Each of modules included in the FW may be configured with a set of source codes for performing a specific operation (or function).

In the present embodiment, the command processing scheduler 245 has been described as being a set of source codes for performing a specific operation (or function), but embodiments are not limited thereto. The command processing scheduler 245 may be implemented using hardware.

The command processing scheduler 245 may dynamically change the processing schedule of a write command and/or a read command based on a pattern of commands queued in the command queuing region 243 of the memory 240. For example, the command processing scheduler 245 may analyze a command queuing pattern corresponding to each of a plurality of memory chips included in the nonvolatile memory 100, and may dynamically change the command processing schedule of each of the plurality of memory chips based on the analyzed command queuing patterns.

In the present embodiment, a command queuing pattern may include a command type pattern indicating whether types of commands queued in the command queuing region 243 have been mixed (such as when the types of commands queued in the command queuing region 243 include both write commands and read commands), and a queuing time pattern indicative of an amount of time from a time at which a write command is queued to a time at which a read command is queued if the read command is queued in the command queuing region 243 after the write command is queued therein. The command type pattern may include a first command type pattern in which a write command and read command are mixed and queued in the command queuing region 243 and a second command type pattern in which a write command and read command are not mixed and queued in the command queuing region 243.

Figure 5:
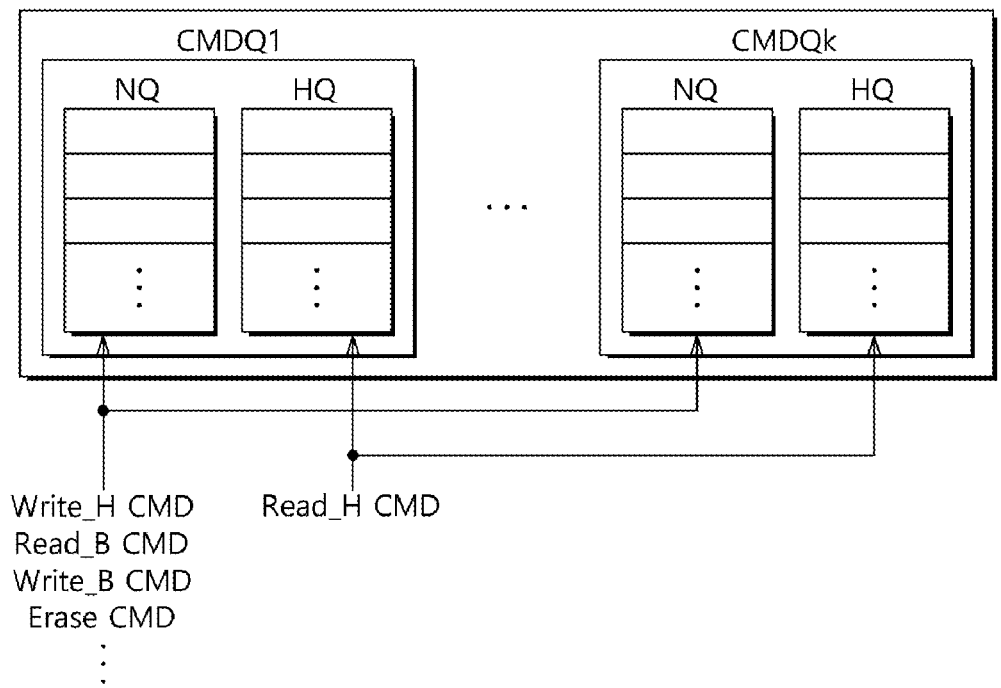
FIG. 5 illustrates a command queuing region of FIG. 4 according to an embodiment.

FIG. 5 is a diagram illustrating the command queuing region 243 of FIG. 4.

The command queuing region 243 may include a plurality of command queues CMDQ1 to CMDQk. In the present embodiment, the number of command queues CMDQ1 to CMDQk may be the same as the number of memory chips included in the nonvolatile memory 100, but embodiments are not limited thereto. That is, the command queuing region 243 may include a plurality of command queues respectively corresponding to a plurality of memory chips included in the nonvolatile memory 100.

Each of the plurality of command queues CMDQ1 to CMDQk may include a normal command queue NQ in which normal commands are queued and a high command queue HQ in which high commands are queued. In the present embodiment, a normal command may indicate a command having a lower priority than a high command. A high command may indicate a command having a higher priority than a normal command.

In the present embodiment, a normal command may include a host write command Write_H CMD and an erase command Erase CMD received from the host 20, a background read command Read_B CMD and a background write command Write_B CMD for background operations, and the like, but embodiments are not limited thereto. Furthermore, a high command may include a host read command Read_H CMD received from the host 20, but embodiments are not limited thereto.

In general, performance of the storage device 10 may be determined by the speed of response to a read command received from the host 20. The second core 220 may queue a host read command, received from the host 20, in the high command queue HQ in which commands each having a high priority are queued, and may queue the remaining commands in the normal command queue NQ in which commands each having a low priority are queued.

For example, when a host read command is queued in the high command queue of a command queue corresponding to a first memory chip included in the nonvolatile memory 100, an operation (e.g., write operation) performed in the first memory chip may be suspended. After a read operation corresponding to a queued host read command is performed, the suspended operation (e.g., the write operation) may resume. The write operation may include a data transmission operation of transmitting data to be written from the controller 200 to the first memory chip of the nonvolatile memory 100 and a write execution operation of storing data in memory cells within the first memory chip. In an embodiment, the data transmission operation cannot be suspended, and only the write execution operation may be suspended.

Accordingly, when the host read command is queued in the high command queue of the command queue corresponding to the first memory chip, if a data transmission operation is being performed on the first memory chip, the read command can be processed only after the execution of that data transmission operation is completed. Accordingly, the speed of response to the read command may be delayed.

Furthermore, if a write execution operation is suspended during the write execution operation, the reliability of data may be degraded due to the occurrence of retention degradation in which charges leak from a memory cell on which a write operation is being executed.

In the present embodiment, in order to prevent the delay of the speed of response to a host read command and improve the reliability of data, a command queuing pattern corresponding to each of a plurality of memory chips included in the nonvolatile memory 100 is analyzed. The processing schedule of a write command for each of the plurality of memory chips is dynamically changed based on the analyzed command queuing pattern.

The command processing scheduler 245 may periodically analyze the command queuing pattern of each of the command queues CMDQ1 to CMDQk according to a preset unit time. For example, the command processing scheduler 245 may monitor commands queued in each of the command queues CMDQ1 to CMDQk during a preset unit time, and may analyze a command queuing pattern, that is, a command type pattern and queuing time pattern, for each of the command queues CMDQ1 to CMDQk based on the results of the monitoring. The command type pattern and queuing time pattern have been described above, and thus a description thereof is omitted herein.

A plurality of unit times may be included from a time at which the storage device 10 is powered on to a time at which the storage device 10 is powered off. The command processing scheduler 245 may analyze the command queuing pattern of each of the command queues CMDQ1 to CMDQk for each unit time, and may dynamically change the processing schedule of a command queued during a subsequent unit time based on a command queuing pattern analyzed during a current unit time. This is described in detail with reference to FIGS. 6 and 7.

Figure 6:
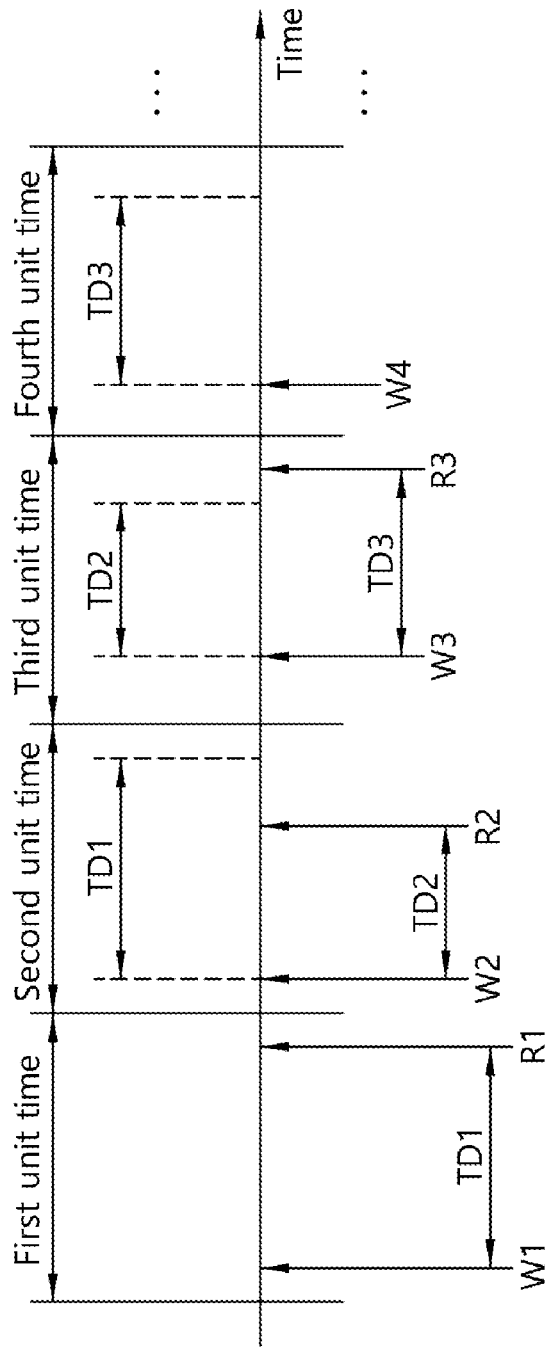
FIG. 6 illustrates an example in which a command processing schedule is dynamically changed according to an embodiment.

FIG. 6 illustrates an example in which the command processing scheduler 245 dynamically changes a command processing schedule according to an embodiment. FIG. 6 illustrates an example in which a command is queued in one command queue. It will be evident to those skilled in the art that the example may be identically applied to each of a plurality of command queues. In FIG. 6, "W1 to W4" indicate write commands, and "R1 to R3" indicate read commands. In this case, the write command may be one of a host write command received from the host 20 and a background write command for a background operation. Furthermore, the read command may be a host read command received from the host 20.

The command processing scheduler 245 may monitor whether a command is queued in a command queue during a first unit time. As illustrated in FIG. 6, when a first write command W1 is queued in the command queue, in order to process the queued first write command W1 without delay, the command processing scheduler 245 may instruct the third core 230 to dequeue the first write command W1 from the command queue and to provide the dequeued first write command W1 to a corresponding memory chip of the nonvolatile memory 100, because a unit time right before the first unit time is not present. That is, because during the first unit time there is no previous unit time during which a command type pattern or queuing time pattern could be analyzed, commands in the queue are processed in order of arrival.

Subsequently, when a first read command R1 is queued in the command queue, the command processing scheduler 245 may analyze the command type pattern of the command queue based on the queuing of the first read command R1 after the first write command W1 was queued. For example, the command processing scheduler 245 may determine that the commands queued in the command queue have a first command type pattern. As described above, the first command type pattern indicates a pattern in which a write command and a read command are mixed and queued. In this case, the read command may be a command corresponding to a host read request received from the host 20.

Furthermore, the command processing scheduler 245 may analyze a queuing time pattern from the timing at which the first write command W1 is queued to the timing at which the first read command R1 is queued, based on the first command type pattern of the commands queued in the command queue. In FIG. 6, the queuing time pattern is indicated as a first delay time TD1. In the present embodiment, the first delay time TD1 may be used as the same term as the queuing time pattern.

The command processing scheduler 245 may change the processing schedule of a write command queued during a second unit time subsequent to the first unit time, based on the queuing time pattern during the first unit time, that is, the first delay time TD1.

The command processing scheduler 245 may determine whether the first delay time TD1 exceeds a preset critical delay time. In the present embodiment, the critical delay time may be set as time necessary to process a write command, that is, the sum of a data transmission time and a write execution time, but embodiments are not specially limited thereto. In another embodiment, the critical delay time may be set as a data transmission time.

When the first delay time TD1 of the first unit time exceeds the critical delay time, during the second unit time, the command processing scheduler 245 may instruct the third core 230 to immediately process a second write command W2 queued in the command queue; in this case, if a read command occurs while the second write command W2 is being processed, in some cases the second write command W2 may be suspended while the read command is processed. When the first delay time TD1 is the critical delay time or less, during the second unit time the command processing scheduler 245 may instruct the third core 230 to process the second write command W2 after a time corresponding to the first delay time TD1 elapses from a time at which the second write command W2 is queued in the command queue, and when a second read command R2 is queued in the command queue within the first delay time TD1 from the time at which the second write command W2 is queued in the command queue, the command processing scheduler 245 may instruct the third core 230 to process the second read command R2 before the second write command W2. The second write command W2 may be processed after the processing of the second read command R2 is completed.

Furthermore, the command processing scheduler 245 may monitor commands queued in the command queue during the second unit time. As illustrated in FIG. 6, when the second write command W2 and the second read command R2 are sequentially queued in the command queue during the second unit time, the command processing scheduler 245 may analyze a queuing time pattern, that is, a second delay time TD2 from a time at which the second write command W2 is queued to a time at which the second read command R2 is queued. The command processing scheduler 245 may change the processing schedule of a write command queued during a third unit time subsequent to the second unit time, based on the second delay time TD2.

As illustrated in FIG. 6, after a third write command W3 is queued in the command queue during the third unit time, when a third read command R3 is not queued within the second delay time TD2, the command processing scheduler 245 may instruct the third core 230 to process the third write command W3 after a time corresponding to the second delay time TD2 elapses from a time at which the third write command W3 is queued.

Furthermore, the command processing scheduler 245 may monitor commands queued in the command queue during the third unit time. As illustrated in FIG. 6, when the third write command W3 and the third read command R3 are sequentially queued in the command queue during the third unit time, the command processing scheduler 245 may analyze a queuing time pattern, that is, a third delay time TD3 from a time at which the third write command W3 is queued to a time at which the third read command R3 is queued. The command processing scheduler 245 may change the processing schedule of a write command queued during a fourth unit time subsequent to the third unit time, based on the third delay time TD3.

As described above, the command processing scheduler 245 according to the present embodiment may process a write command, queued in a command queue during a current unit time, immediately upon the queuing of the write command, based on queuing patterns of commands queued in the command queue during a unit time immediately before the current unit time, or may process the write command after delaying the write command by a delay time determined based on a queuing pattern during a unit time immediately before the current unit time, or may process the write command after first processing a read command. Accordingly, read performance can be improved because a read request received from the host 20 is processed without delay, and the reliability of data can be improved because a write operation is prevented from being frequently suspended.

Figure 7:
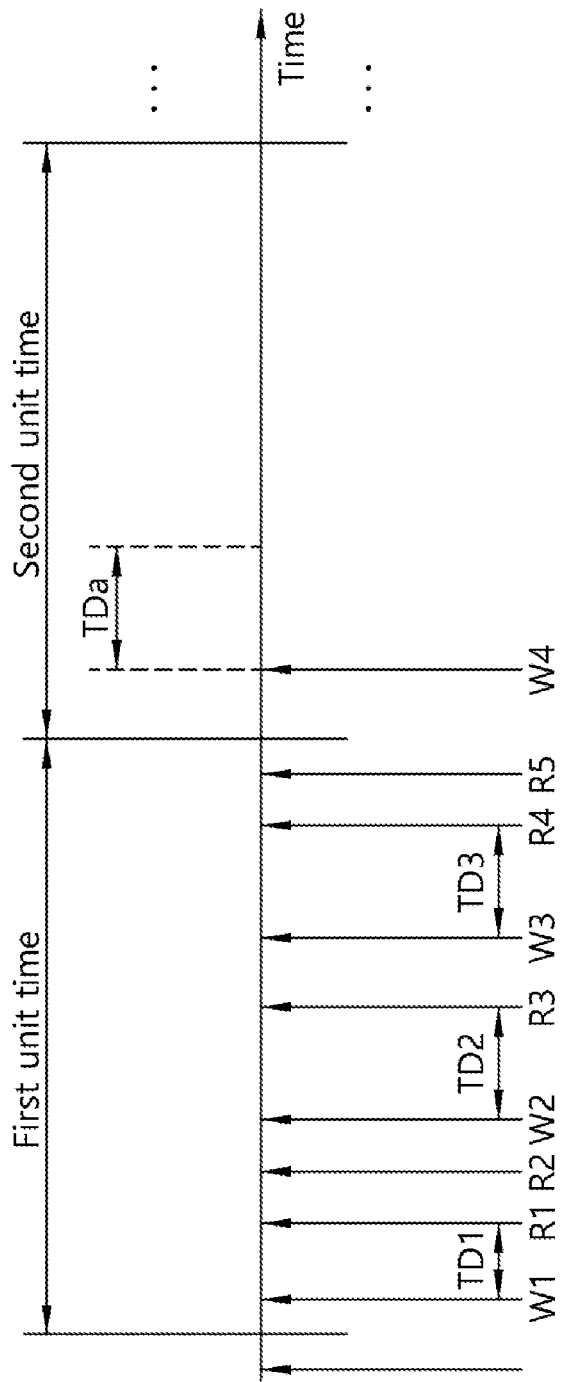
FIG. 7 illustrates an example in which a command processing schedule is dynamically changed according to another embodiment.

FIG. 7 is a diagram illustrating an example in which a command processing schedule is dynamically changed according to another embodiment. FIG. 7 illustrates an example in which a plurality of write commands and a plurality of read commands are mixed and queued during one unit time. Contents of the present embodiment overlapping the aforementioned description of FIG. 6 are omitted, and a difference is chiefly described.

Referring to FIG. 7, a first write command W1, a first read command R1, a second read command R2, a second write command W2, a third read command R3, a third write command W3, a fourth read command R4 and a fifth read command R5 may be sequentially queued in a command queue during a first unit time. The command processing scheduler 245 may analyze a first delay time TD1 from timing at which the first write command W1 is queued to timing at which the first read command R1 is queued, a second delay time TD2 from timing at which the second write command W2 is queued to timing at which the third read command R3 is queued, and a third delay time TD3 from timing at which the third write command W3 is queued to timing at which the fourth read command R4 is queued. That is, the command processing scheduler 245 may analyze delay times from a time of queuing of each write command to a time of queuing of an immediately following read command of each write command.

The command processing scheduler 245 may compute an average delay time TDa of the first delay time TD1, the second delay time TD2 and the third delay time TD3, and may change the processing schedule of a write command queued during a second unit time subsequent to the first unit time, based on the computed average delay time TDa.

As described above, when a plurality of write commands and a plurality of read commands are mixed and queued during one unit time, the command processing scheduler 245 may immediately process a write command queued during a subsequent unit time based on an average of respective amounts of time from times at which the plurality of write commands are queued and to times at which the plurality of read commands are queued after the respective write commands are queued, or may process the write command after delaying the write command by a given time, or may process the write command after the processing of a read command is completed.

Figure 8:
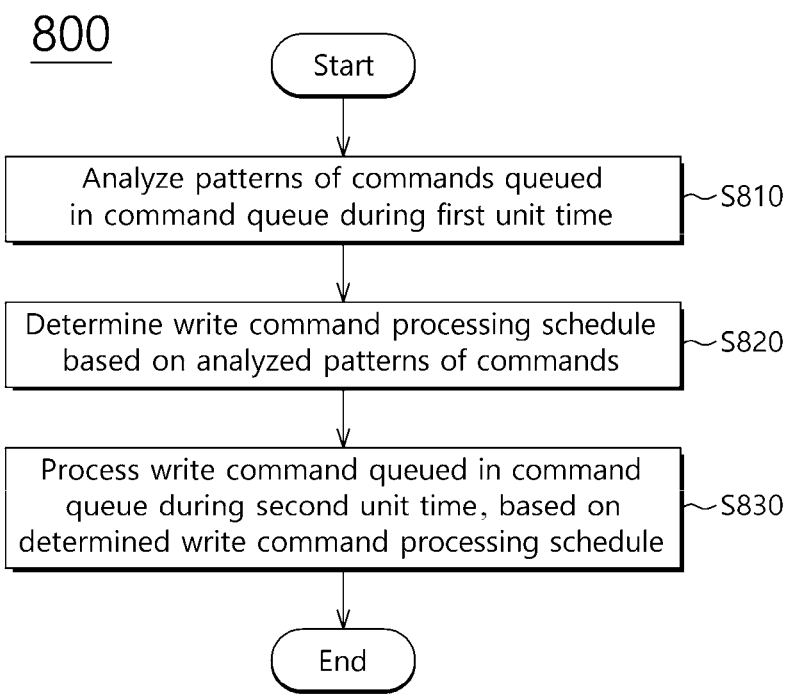
FIG. 8 illustrates an operating process of the controller according to an embodiment.

FIG. 8 is a flowchart illustrating an operating process 800 of the controller according to an embodiment. In describing the operating process 800 of the controller according to the present embodiment with reference to FIG. 8, reference may be made to at least one of FIGS. 1 to 7.

At step S810, the controller 200 of the storage device 10 may analyze patterns of commands queued in the command queue 243 during a first unit time. For example, the controller 200 may analyze the patterns of the commands by determining whether types of commands queued in the command queue 243 have been mixed and measuring an amount of time from a time at which a write command is queued in the command queue 243 to a time at which a read command is queued after the write command is queued.

At step S820, the controller 200 may determine a write command processing schedule based on the patterns of the commands analyzed at step S810. For example, the controller 200 may determine whether a measured time is a preset critical time or less, and may determine processing timing of the write command queued in the command queue during the second unit time based on a result of the determination.

At step S830, the controller 200 may process a write command, queued in the command queue 243 during a second unit time subsequent to the first unit time, based on the write command processing schedule determined at step S820.

For example, when the measured time is the critical time or less, the controller 200 may process the write command, queued in the command queue 243 during the second unit time, after the measured time elapses. In this case, when a read command is queued in the command queue 243 within the measured time, the controller 200 may process the write command after the processing of the read command is completed. In an embodiment, when the measured time is the critical time or less and the write command is enqueued into a command queue 243 still holding other previously-queued commands, controller 200 may process the write command after the write command reaches the head of the command queue 243 and the measured time has elapsed.

Furthermore, when the measured time exceeds the critical time, the controller 200 may immediately process without delay the write command queued in the command queue 243 during the second unit time. In an embodiment, when the measured time exceeds the critical time and the write command is enqueued into a command queue 243 still holding other previously-queued commands, controller 200 may process the write command immediately after the write command reaches the head of the command queue 243.

According to the present embodiment, a write command queued in a command queue during a current unit time is processed immediately upon queued, based on a queuing pattern of commands queued in the command queue during a unit time right before current unit time, or the write command is processed after being delayed by a delay time, or the write command is processed after a read command is first processed. Accordingly, read performance can be improved because a read request received from a host is processed without delay, and the reliability of data can be improved because a write operation is prevented from being frequently suspended.

Figure 9:
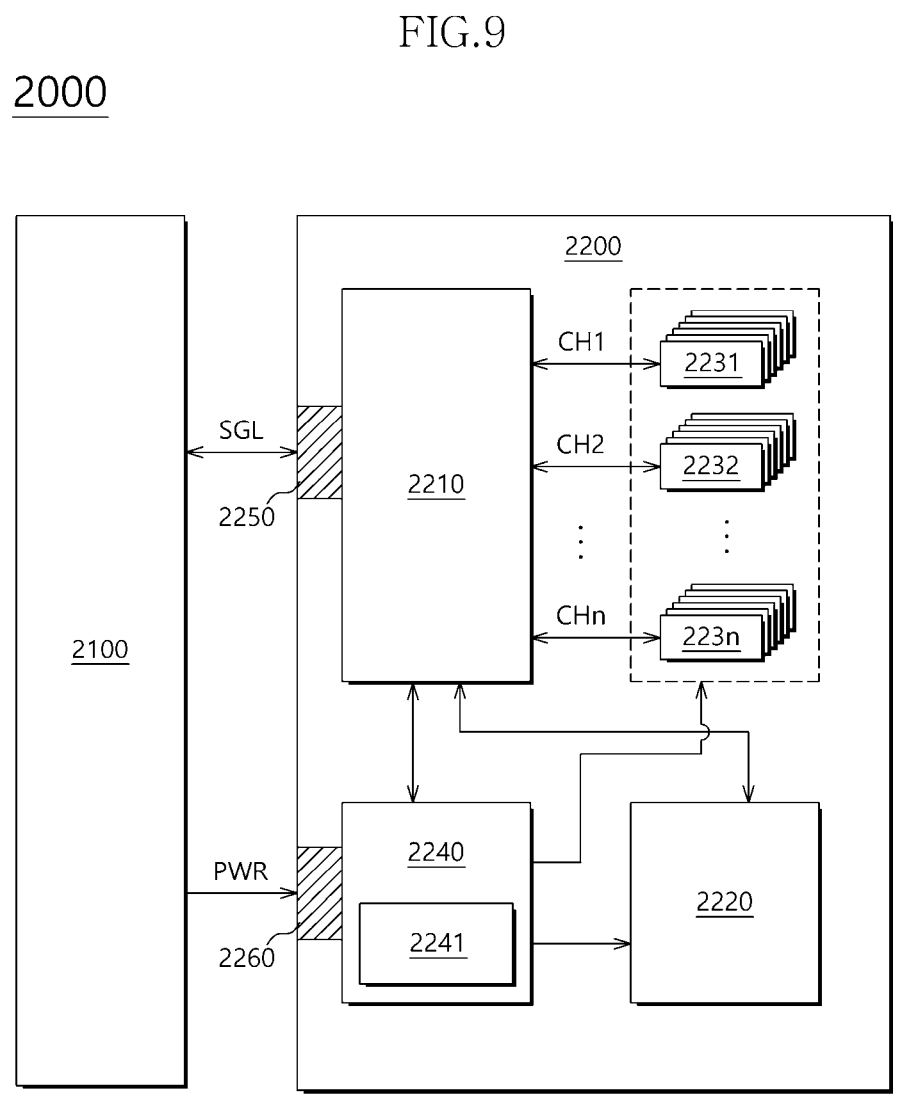
FIG. 9 illustrates a data processing system including a solid state drive (SSD) in accordance with an embodiment.

FIG. 9 illustrates a data processing system 2000 including a solid state drive (SSD) 2200 in accordance with an embodiment. The data processing system 2000 may include a host apparatus 2100 and the SSD 2200.

The SSD 2200 may include a controller 2210, a buffer memory device 2220, nonvolatile memory devices 2231 to 223*n*, a power supply 2240, a signal connector 2250, and a power connector 2260.

The controller 2210 may control an overall operation of the SSD 2220. The controller 2210 may perform the functions described as being performed by the controller 200 of FIGS. 1-3.

The buffer memory device 2220 may temporarily store data to be stored in the nonvolatile memory devices 2231 to 223*n*. The buffer memory device 2220 may temporarily store data read from the nonvolatile memory devices 2231 to 223*n*. The data temporarily stored in the buffer memory device 2220 may be transmitted to the host apparatus 2100 or the nonvolatile memory devices 2231 to 223*n* according to control of the controller 2210.

The nonvolatile memory devices 2231 to 223*n* may be used as a storage medium of the SSD 2200. The nonvolatile memory devices 2231 to 223*n* may be coupled to the controller 2210 through a plurality of channels CH1 to CHn. One or more nonvolatile memory devices may be coupled to one channel. The nonvolatile memory devices coupled to the one channel may be coupled to the same signal bus and the same data bus.

The power supply 2240 may provide power PWR input through the power connector 2260 to the inside of the SSD 2200. The power supply 2240 may include an auxiliary power supply 2241. The auxiliary power supply 2241 may supply the power so that the SSD 2200 is normally terminated even when sudden power-off occurs. The auxiliary power supply 2241 may include large capacity capacitors capable of charging the power PWR.

The controller 2210 may exchange a signal SGL with the host apparatus 2100 through the signal connector 2250. The signal SGL may include a command, an address, data, and the like. The signal connector 2250 may be configured of various types of connectors according to an interfacing method between the host apparatus 2100 and the SSD 2200.

Figure 10:
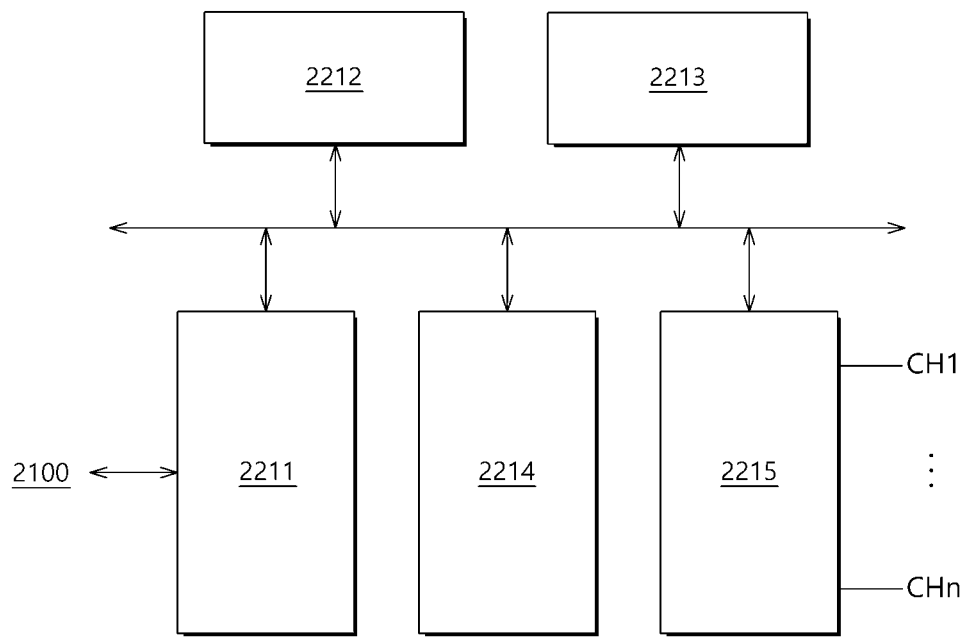
FIG. 10 illustrates a controller illustrated in FIG. 9.

FIG. 10 illustrates the controller 2210 of FIG. 9. Referring to FIG. 10, the controller 2210 may include a host interface unit 2211, a control unit 2212, a random access memory (RAM) 2213, an error correction code (ECC) unit 2214, and a memory interface unit 2215.

The host interface unit 2211 may perform interfacing between the host apparatus 2100 and the SSD 2200 according to a protocol of the host apparatus 2100. For example, the host interface unit 2211 may communicate with the host apparatus 2100 through any one among a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI Express (PCI-E) protocol, and a universal flash storage (UFS) protocol. The host interface unit 2211 may perform a disc emulation function that the host apparatus 2100 recognizes the SSD 2200 as a general-purpose data storage apparatus, for example, a hard disc drive HDD.

The control unit 2212 may analyze and process the signal SGL input from the host apparatus 2100. The control unit 2212 may control operations of internal functional blocks according to firmware and/or software for driving the SDD 2200. The RAM 2213 may be operated as a working memory for driving the firmware or software.

The ECC unit 2214 may generate parity data for the data to be transferred to the nonvolatile memory devices 2231 to 223n. The generated parity data may be stored in the nonvolatile memory devices 2231 to 223n together with the data. The ECC unit 2214 may detect errors for data read from the nonvolatile memory devices 2231 to 223n based on the parity data. When detected errors are within a correctable range, the ECC unit 2214 may correct the detected errors.

The memory interface unit 2215 may provide a control signal such as a command and an address to the nonvolatile memory devices 2231 to 223n according to control of the control unit 2212. The memory interface unit 2215 may exchange data with the nonvolatile memory devices 2231 to 223n according to control of the control unit 2212. For example, the memory interface unit 2215 may provide data stored in the buffer memory device 2220 to the nonvolatile memory devices 2231 to 223n or provide data read from the nonvolatile memory devices 2231 to 223n to the buffer memory device 2220.

Figure 11:
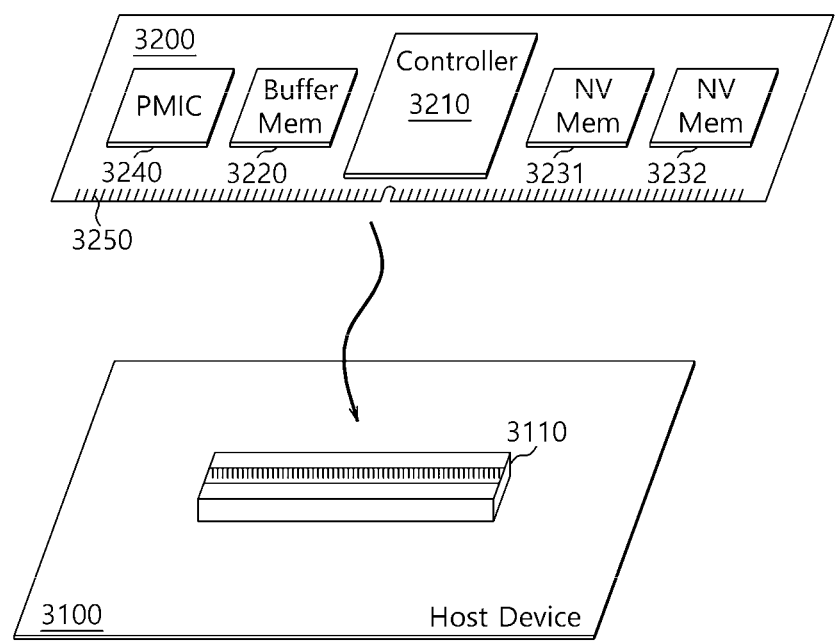
FIG. 11 illustrates a data processing system including a data storage apparatus in accordance with an embodiment.

FIG. 11 illustrates a data processing system 3000 including a data storage apparatus 3200 in accordance with an embodiment. The data processing system 3000 may include a host apparatus 3100 and the data storage apparatus 3200.

The host apparatus 3100 may be configured in a board form such as a printed circuit board (PCB). Although not shown in FIG. 11, the host apparatus 3100 may include internal functional blocks configured to perform functions of the host apparatus 3100.

The host apparatus 3100 may include a connection terminal 3110 such as a socket, a slot, or a connector. The data storage apparatus 3200 may be mounted on the connection terminal 3110.

The data storage apparatus 3200 may be configured in a board form such as a PCB. The data storage apparatus 3200 may refer to a memory module or a memory card. The data storage apparatus 3200 may include a controller 3210, a buffer memory device 3220, nonvolatile memory devices 3231 to 3232, a power management integrated circuit (PMIC) 3240, and a connection terminal 3250.

The controller 3210 may control an overall operation of the data storage apparatus 3200. The controller 3210 may be configured to have the same configuration as the controller 2210 illustrated in FIG. 10.

The buffer memory device 3220 may temporarily store data to be stored in the nonvolatile memory devices 3231 and 3232. The buffer memory device 3220 may temporarily store data read from the nonvolatile memory devices 3231 and 3232. The data temporarily stored in the buffer memory device 3220 may be transmitted to the host apparatus 3100 or the nonvolatile memory devices 3231 and 3232 according to control of the controller 3210.

The nonvolatile memory devices 3231 and 3232 may be used as a storage medium of the data storage apparatus 3200.

The PMIC 3240 may provide power input through the connection terminal 3250 to the inside of the data storage apparatus 3200. The PMIC 3240 may manage the power of the data storage apparatus 3200 according to control of the controller 3210.

The connection terminal 3250 may be coupled to the connection terminal 3110 of the host apparatus 3100. A signal such as a command, an address, and data and power may be transmitted between the host apparatus 3100 and the data storage apparatus 3200 through the connection terminal 3250. The connection terminal 3250 may be configured in various forms according to an interfacing method between the host apparatus 3100 and the data storage apparatus 3200.

The connection terminal 3250 may be arranged in any one side of the data storage apparatus 3200.

Figure 12:
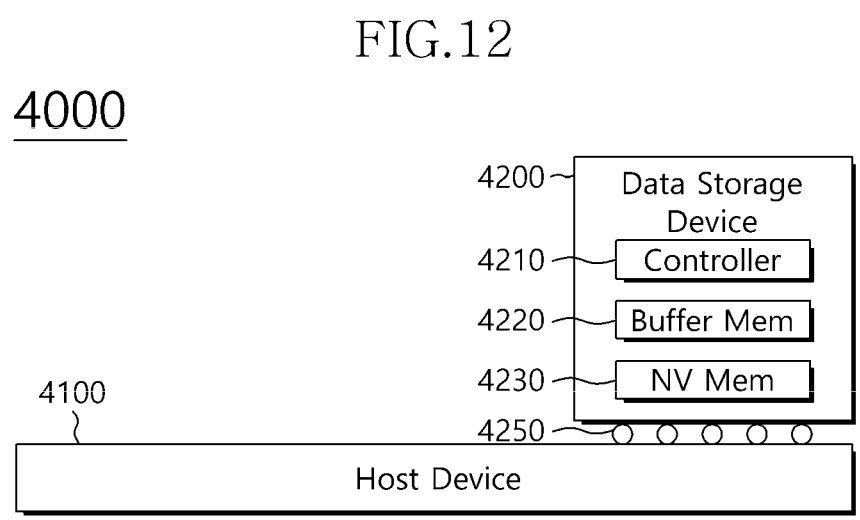
FIG. 12 illustrates a data processing system including a data storage apparatus in accordance with an embodiment.

FIG. 12 illustrates a data processing system 4000 including a data storage apparatus 4200 in accordance with an embodiment. The data processing system 4000 may include a host apparatus 4100 and the data storage apparatus 4200.

The host apparatus 4100 may be configured in a board form such as a PCB. Although not shown in FIG. 12, the host apparatus 4100 may include internal functional blocks configured to perform functions of the host apparatus 4100.

The data storage apparatus 4200 may be configured in a surface mounting packaging form. The data storage apparatus 4200 may be mounted on the host apparatus 4100 through a solder ball 4250. The data storage apparatus 4200 may include a controller 4210, a buffer memory device 4220, and a nonvolatile memory device 4230.

The controller 4210 may control an overall operation of the data storage apparatus 4200. The controller 4210 may be configured to have the same configuration as the controller 2210 illustrated in FIG. 10.

The buffer memory device 4220 may temporarily store data to be stored in the nonvolatile memory device 4230. The buffer memory device 4220 may temporarily store data read from the nonvolatile memory device 4230. The data temporarily stored in the buffer memory device 4220 may be transmitted to the host apparatus 4100 or the nonvolatile memory device 4230 through control of the controller 4210.

The nonvolatile memory device 4230 may be used as a storage medium of the data storage apparatus 4200.

Figure 13:
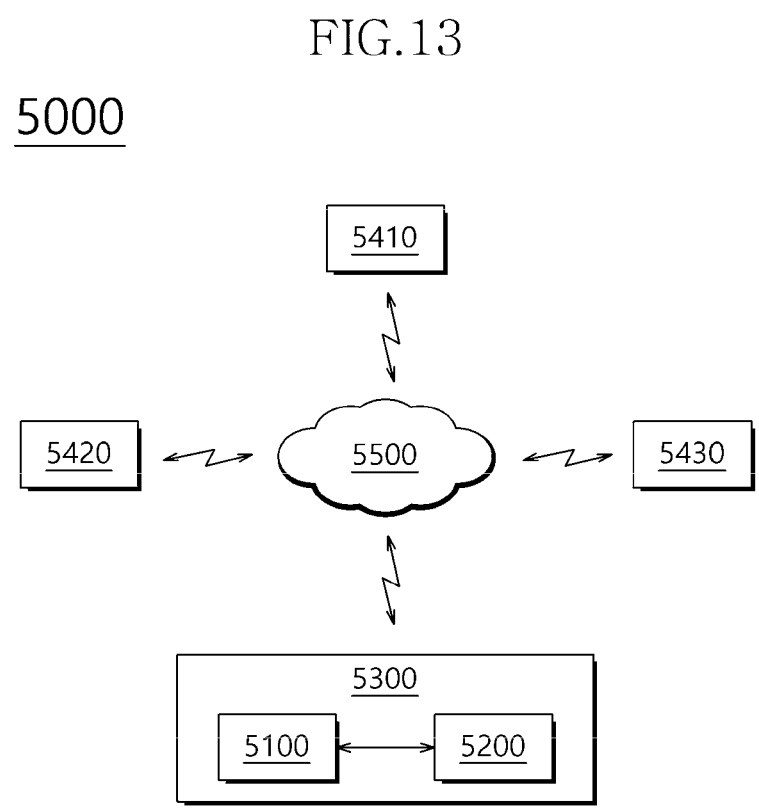
FIG. 13 illustrates a network system including a data storage apparatus in accordance with an embodiment.

FIG. 13 illustrates a network system 5000 including a data storage apparatus in accordance with an embodiment. Referring to FIG. 13, the network system 5000 may include a server system 5300 and a plurality of client systems 5410 to 5430 which are coupled through a network 5500.

The server system 5300 may serve data in response to requests of the plurality of client systems 5410 to 5430. For example, the server system 5300 may store data provided from the plurality of client systems 5410 to 5430. In another example, the server system 5300 may provide data to the plurality of client systems 5410 to 5430.

The server system 5300 may include a host apparatus 5100 and a data storage apparatus 5200. The data storage apparatus 5200 may be configured of the storage device 10 of FIG. 1, the SSD 2200 of FIG. 9, the data storage apparatus 3200 of FIG. 11, or the data storage apparatus 4200 of FIG. 12.

FIG. 14 illustrates a nonvolatile memory device included in a data storage apparatus in accordance with an embodiment. Referring to FIG. 14, a nonvolatile memory device 100 may include a memory cell array 110, a row decoder 120, a column decoder 140, a data read/write block 130, a voltage generator 150, and a control logic 160.

The memory cell array 110 may include memory cells MC arranged in regions in which word lines WL1 to WLm and bit lines BL1 to BLn cross to each other.

The row decoder 120 may be coupled to the memory cell array 110 through the word lines WL1 to WLm. The row decoder 120 may operate through control of the control logic 160. The row decoder 120 may decode an address provided from an external apparatus (not shown). The row decoder 120 may select and drive the word lines WL1 to WLm based on a decoding result. For example, the row decoder 120 may provide a word line voltage provided from the voltage generator 150 to the word lines WL1 to WLm.

The data read/write block 130 may be coupled to the memory cell array 110 through the bit lines BL1 to BLn. The data read/write block 130 may include read/write circuits RW1 to RWn corresponding to the bit lines BL1 to BLn. The data read/write block 130 may operate according to control of the control logic 160. The data read/write block 130 may operate as a write driver or a sense amplifier according to an operation mode. For example, the data read/write block 130 may operate as the write driver configured to store data provided from an external apparatus in the memory cell array 110 in a write operation. In another example, the data read/write block 130 may operate as the sense amplifier configured to read data from the memory cell array 110 in a read operation.

The column decoder 140 may operate though control of the control logic 160. The column decoder 140 may decode an address provided from an external apparatus (not shown). The column decoder 140 may couple the read/write circuits RW1 to RWn of the data read/write block 130 corresponding to the bit lines BL1 to BLn and data input/output (I/O) lines (or data I/O buffers) based on a decoding result.

The voltage generator 150 may generate voltages used for an internal operation of the nonvolatile memory device 100. The voltages generated through the voltage generator 150 may be applied to the memory cells of the memory cell array 110. For example, a program voltage generated in a program operation may be applied to word lines of memory cells in which the program operation is to be performed. In another example, an erase voltage generated in an erase operation may be applied to well regions of memory cells in which the erase operation is to be performed. In another example, a read voltage generated in a read operation may be applied to word lines of memory cells in which the read operation is to be performed.

The control logic 160 may control an overall operation of the nonvolatile memory device 100 based on a control signal provided from an external apparatus. For example, the control logic 160 may control an operation of the nonvolatile memory device 100 such as a read operation, a write operation, an erase operation of the nonvolatile memory device 100.

While various embodiments have been described above, it will be understood to those skilled in the art that the embodiments described are by way of example only. Accordingly, the memory controller, storage apparatus and operating method described herein should not be limited based on the described embodiments.

What is claimed is:

1. A controller configured to control an operation of a nonvolatile memory, wherein the controller is configured to perform steps comprising:
analyzing patterns of commands queued in a command queue during a first unit time, the commands queued in the command queue during the first unit time including a first write command, a first read command, or both,
determining a processing schedule of a write command to be queued in the command queue during a second unit time subsequent to the first unit time based on the patterns of the commands, and
processing a second write command queued in the command queue during the second unit time immediately after being queued or after a certain amount of time has elapsed from the queued time based on the determined processing schedule of the write command,
wherein the patterns of commands include a queuing time pattern indicative of an amount of time from a time at which a first command was queued to a time at which a second command of a different type from the first command was queued.

2. The controller according to claim 1, wherein the controller is configured to analyze the patterns of the commands based on whether types of the commands queued in the command queue have been mixed, and on an amount of time from a time at which the first write command is queued in the command queue to a time at which the first read command is queued after the first write command is queued.

3. The controller according to claim 2, wherein the controller is configured to:
determine whether the amount of time is a critical time or less, and
process the second write command after the amount of time elapses from the time the second write command is queued when the amount of time is the critical time or less.

4. The controller according to claim 3, wherein the controller is configured to process the second write command after first processing a second read command queued in the command queue during the second unit time when the second read command is queued in the command queue within the amount of time after the second write command is queued in the command queue.

5. The controller according to claim 3, wherein the controller is configured to immediately process the second write command when the amount of time exceeds the critical time.

6. The controller according to claim 3, wherein the critical time corresponds to time necessary to process the second write command.

7. The controller according to claim 3, wherein processing the second write command comprises:
a data transmission operation of transmitting, to the nonvolatile memory, write data corresponding to the second write command; and
a write execution operation of storing the write data in a region of the nonvolatile memory corresponding to the second write command.

8. The controller according to claim 7, wherein the critical time corresponds to an amount of time necessary for the data transmission operation.

9. The controller according to claim 7, wherein the critical time corresponds to a sum of a first amount of time necessary for the data transmission operation and a second amount of time necessary for the write execution operation.

10. The controller according to claim 2, wherein:
the first write command comprises a host write command generated in response to a write request from a host or a background write command generated by the controller without an intervention of the host, and
the first read command comprises a host read command generated in response to a read request from the host.

11. An operating method of a controller configured to control an operation of a nonvolatile memory, the operating method comprising:
analyzing patterns of commands queued in a command queue during a first unit time, the commands queued in the command queue during the first unit time including a first write command, a first read command, or both;
determining a processing schedule of a write command to be queued in the command queue during a second unit time subsequent to the first unit time based on the patterns of the commands; and
processing a second write command queued in the command queue during the second unit time immediately after being queued or after a certain amount of time has elapsed from the queued time based on the determined processing schedule of the write command, wherein the patterns of commands include a queuing time pattern indicative of an amount of time from a time at which a first command was queued to a time at which a second command of a different type from the first command was queued.

12. The operating method according to claim 11, wherein analyzing the patterns of the commands comprises:
   determining whether types of the commands queued in the command queue have been mixed; and
   measuring an amount of time from a time at which the first write command is queued in the command queue to a time at which the first read command is queued in the command queue after the first write command is queued.

13. The operating method according to claim 12, wherein determining the processing schedule of the write command comprises:
   determining whether the measured amount of time is a critical time or less; and
   determining processing timing of the second write command based on a result of the determination.

14. The operating method according to claim 13, wherein processing the second write command based on the processing schedule comprises processing the second write command after the measured amount of time elapses from the time the second write command is queued when the measured amount of time is the critical time or less.

15. The operating method according to claim 14, further comprising processing the second write command after completely processing a second read command when the second read command is queued in the command queue within the measured amount of time after the second write command was queued in the command queue.

16. The operating method according to claim 13, wherein processing the second write command based on the processing schedule comprises immediately processing the second write command when the measured amount of time exceeds the critical time.

17. A storage device comprising:
   a nonvolatile memory; and
   a controller configured to control an operation of a nonvolatile memory in response to a request from a host,
   wherein the controller is configured to:
      analyze patterns of commands queued in a command queuing region during a first unit time, the commands queued in the command queuing region during the first unit time including a first write command, a first read command, or both,
      determine a processing schedule of a write command to be queued in the command queue during a second unit time subsequent to the first unit time based on the patterns of the commands, and
      process a second write command queued in the command queuing region during the second unit time immediately after being queued or after a certain amount of time has elapsed from the queued time based on the determined processing schedule of the write command, and
   wherein the patterns of commands include a queuing time pattern indicative of an amount of time from a time at which a first command was queued to a time at which a second command of a different type from the first command was queued.

18. The storage device according to claim 17, wherein:
   the nonvolatile memory comprises a plurality of memory chips, and
   the command queuing region comprises a plurality of command queues corresponding to the plurality of memory chips, respectively.

19. The storage device according to claim 18, wherein the controller is configured to determine the processing schedule of the write command of each of the plurality of memory chips by analyzing patterns of commands queued in each of the plurality of command queues during the first unit time.

20. The storage device according to claim 18, wherein each of the plurality of command queues comprises:
   a normal command queue in which commands having a first priority are queued, and
   a high command queue in which commands having a second priority higher than the first priority are queued.

21. The storage device according to claim 20, wherein:
   the normal command queue is configured to queue a host write command corresponding to a write request received from the host, and a background write command and a background read command each related to a background operation performed within the storage device without an intervention of the host, and
   the high command queue is configured to queue a host read command corresponding to a read request received from the host.

22. The storage device according to claim 21, wherein the controller is configured to analyze the respective patterns of the commands for each of the plurality of command queues based on whether one or more types of commands have been mixed and queued in the command queue, and an amount of time from a time at which the host write command or background write command is queued in the normal command queue of the command queue to a time at which the host read command is queued in the high command queue of the command queue after the host write command or the background write command is queued.

23. The storage device according to claim 22, wherein the controller is configured to:
   determine whether the amount of time of a first command queue of the plurality of command queues is a critical time or less, the first command queue being the command queue in which the second write command is queued, and
   process the second write command after the amount of time of a first command queue elapses when the amount of time of the first command queue is the critical time or less.

24. The storage device according to claim 23, wherein the controller is configured to process the second write command after first processing a second read command when the second read command is queued into the first command queue within the amount of time of the first command queue after the second write command was queued.

25. The storage device according to claim 23, wherein the controller is configured to immediately process the second write command when the amount of time of the first command queue exceeds the critical time.

* * * * *